UNITED STATES PATENT OFFICE.

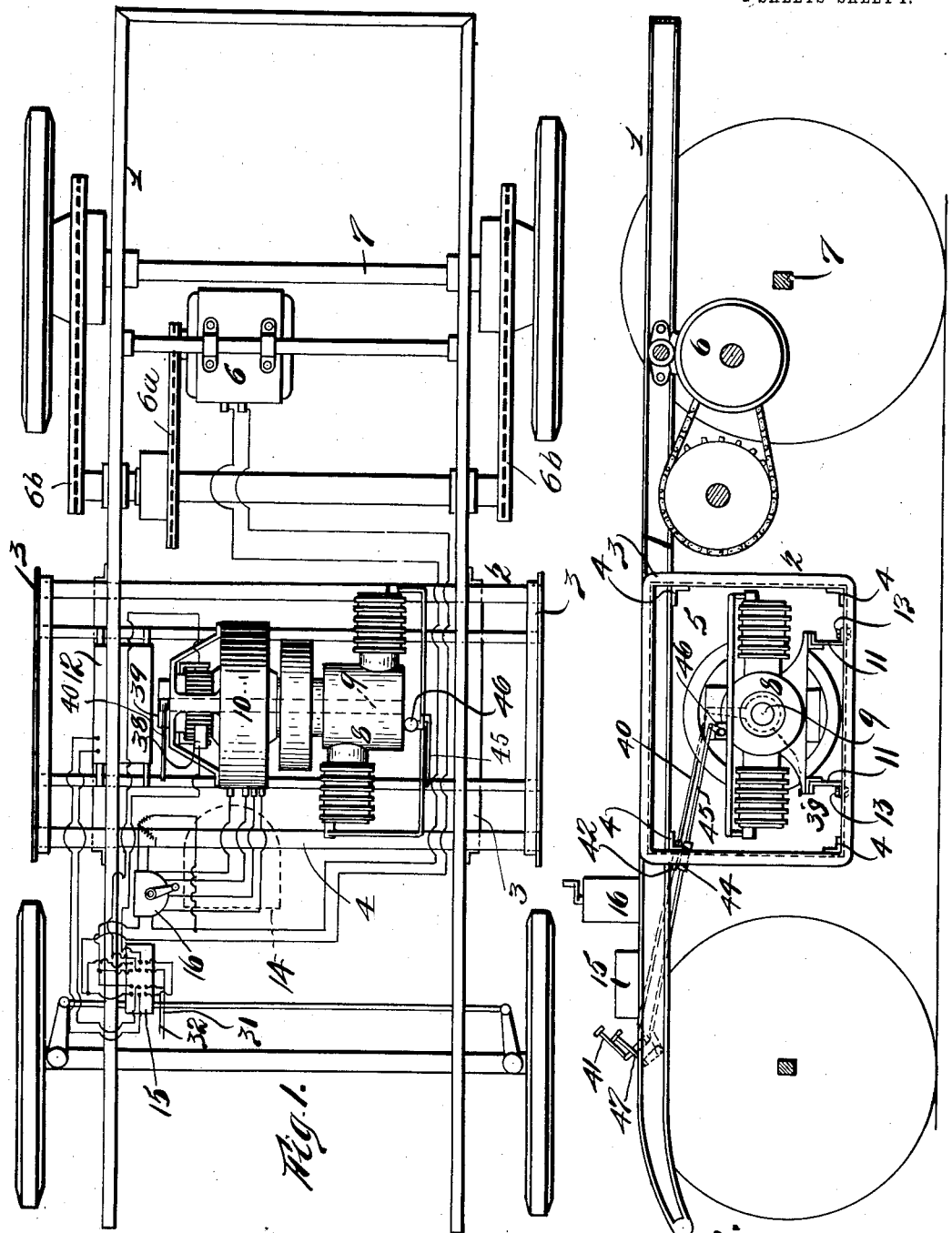

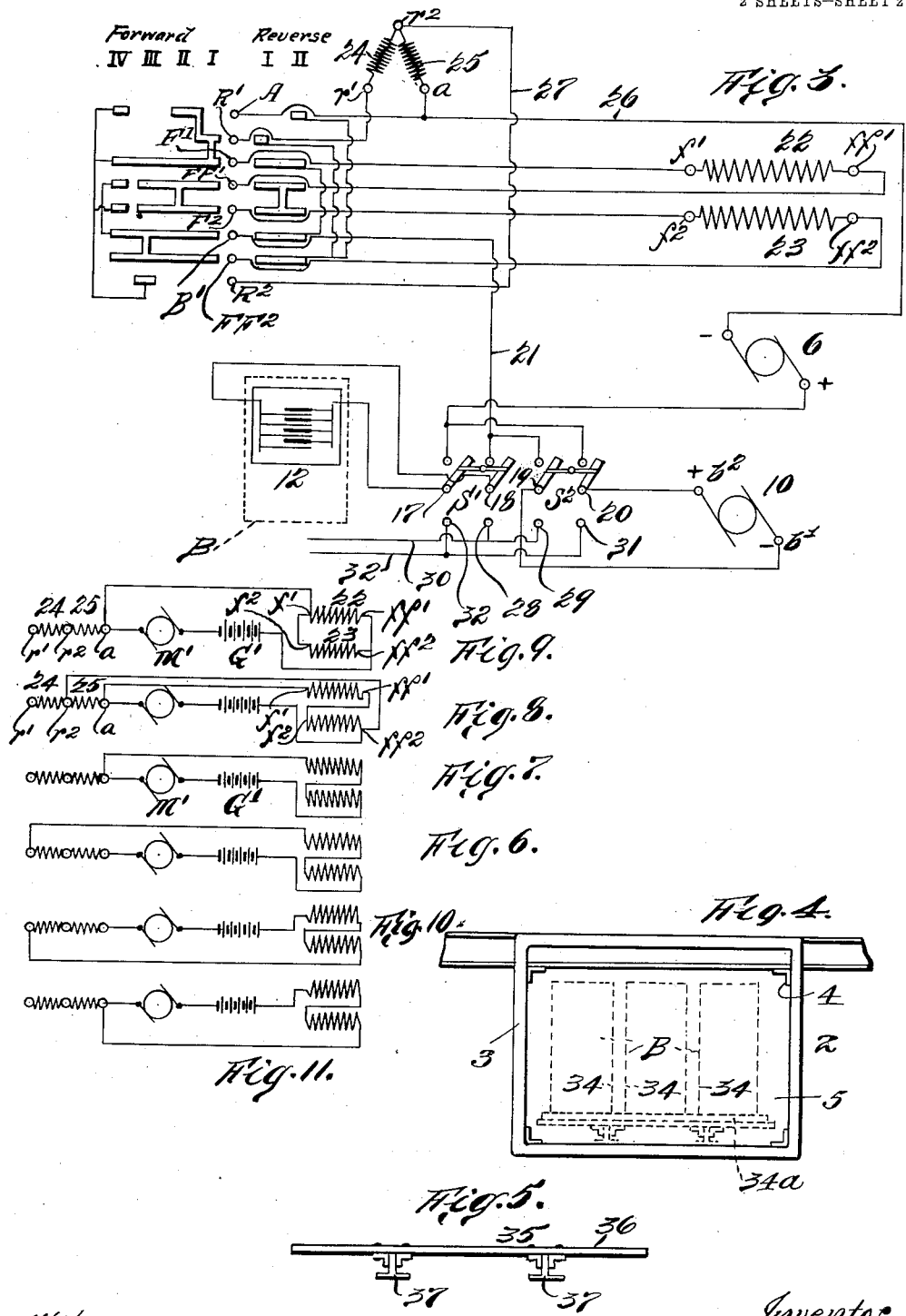

CHARLES A. WARD, OF NEW YORK, N. Y.

MOTOR-TRUCK.

1,111,510.   Specification of Letters Patent.   Patented Sept. 22, 1914.

Application filed November 16, 1912. Serial No. 731,683.

*To all whom it may concern:*

Be it known that I, CHARLES A. WARD, a citizen of the United States, residing at New York city, New York, have invented certain new and useful Improvements in Motor-Trucks, of which the following is a clear, full, and exact description.

This invention relates to vehicles and particularly to their propelling means.

A principal object of the invention is to provide a construction and arrangement enabling the vehicle to be driven by electricity either from a storage battery, or from mechanism for developing electric power including a prime mover such as an engine.

A further object of the invention is to provide an arrangement for controlling the power developing mechanism which will enable the storage battery which propels the vehicle and the power developing mechanism to be interchangeable, by making certain very simple disconnections and connections of certain parts.

The invention consists in the general combination of parts and simplicity of details hereinafter described, all of which contribute to produce an efficient vehicle which may be driven interchangeably by a storage battery or by a power developing mechanism.

A preferred embodiment of my invention will be particularly described in the following specification while the broad scope of my invention will be pointed out in the appended claims.

In the drawings Figure 1 is a plan showing a chassis to which my invention has been applied; Fig. 2 is a side elevation of the chassis; Fig. 3 is a diagram showing the relation of the parts and the wiring connections, representing the motor of the vehicle as connected with the power developing mechanism; Fig. 4 is a side elevation illustrating the hanger which is formed on the chassis for interchangeably carrying the power mechanism or battery; Fig. 5 is an end elevation of a grid which may be slid into the hanger when the power machinery is removed and which is adapted to support the battery; Figs. 6, 7, 8 and 9 are diagrams showing different circuit arrangements giving different forward speeds of the vehicle; and Figs. 10 and 11 show diagrams of the circuit arrangement for producing two reverse speeds.

Before proceeding with a detail description of the invention, it will facilitate the disclosure to state that in carrying out the invention I prefer to provide an electric motor or motors supported on the chassis and connected with the driving wheels to drive the vehicle, and the chassis has a special construction for removably supporting power developing mechanism for generating electricity to drive the aforesaid motor. This driving mechanism is preferably constructed as a unit power plant or power mechanism, that is it preferably comprises an engine such as a gasolene engine connected directly to a generator on the same shaft and preferably arranged with the shaft extending transversely to the vehicle to facilitate the placing of the power mechanism in its hanger in the chassis. When this power mechanism is in place, controlling connections are made from the driver's position for controlling the operation of the engine and the generator. These parts may be disconnected when desired, to permit the power mechanism to be removed, and they then leave the interior of the hanger unobstructed so as to receive the batteries which may then be connected up in the circuits to drive the vehicle.

The power mechanism preferably includes a battery which may be a storage battery, and this battery affords means for starting up the engine without necessitating the usual cranking process which is usually necessary in starting gasolene engines, and arrangement is made for enabling this battery when in the form of a storage battery, to be charged from the generator of the power mechanism or from an exterior source of electro-motive force.

Referring more particularly to the parts, 1 represents the chassis of the vehicle. In applying my invention I provide the chassis preferably near its middle point with a hanger 2, which is preferably of box-like form and may be constructed of a plurality of rectangular frames 3 disposed in a front and rear plane and connected by parallel bars 4 which hold the frames in position and which may connect the structure rigidly to the chassis. In this way a rectangular space or power chamber 5 is formed directly under the main frame of the chassis and extending transversely to the sides of the vehicle so as to be accessible from each side. The vehicle is preferably driven by chains 6$^a$ and 6$^b$, by an electric-motor 6 which may be mounted near the rear axle 7. This electric-motor may be driven either by a battery held in the power chamber 5 or by power mechanism supported in said chamber. Figs. 1 and 2 show the power mechanism arranged for driving the motor 6. This power mechanism preferably comprises a gasolene engine 8 of any suitable construction but preferably arranged with its shaft 9 forming an extension of the shaft of the generator or dynamo 10 which is set up beside the engine, and the frame of the engine and dynamo may be rigidly connected together so that they may be removed as one piece from the interior of the hanger. I prefer to support the engine and the generator on a common bed-plate 11 which may also support an auxiliary storage battery 12. The bed-plate is rigidly attached in the hanger by removable bolts 13 so that when desired, the bolts may be removed and the engine, generator and auxiliary battery all removed together after making the proper disconnections of parts. Preferably near the driver's seat 14, I provide a switch-board 15 and a controller 16, and the switch-board and the controller are connected with the generator 10 and the storage battery 12 and also with the motor 6 by wiring connections which are most clearly illustrated in Fig. 3. The switch-board is preferably provided with two double-throw, double-pole switches $S^1$, $S^2$. The connection points 17 and 18 of the levers of the switch $S^1$ are preferably connected with the terminals of the storage battery 12 while the corresponding points 19 and 20 of the switch $S^2$ are connected with the terminals $b^2$ and $b^1$ of the generator 10. Two of the upper terminals of the switches are connected in parallel with one terminal of the motor 6 and the other two are connected in the same manner by conductor 21 with the controller contact B'. The controller 16 which is preferably adjacent the switch-board and near the driver's seat is arranged so as to give the proper effects in starting up the generator and for controlling the circuits. The controller is illustrated diagrammatically together with four line positions marked I, II, etc., corresponding to the different controller positions for forward movement and with two similar lines corresponding with two reverse positions of the controller. In the first forward position the circuit illustrated in Fig. 6 is produced, that is, the current passes through the two field coils 22 and 23 in series and likewise through the resistance 24 and 25. This is effected by connecting the contact R' with the contact F', said contact R' being connected with the terminal r' of the two resistances, the other terminal a being connected with the return wire 26 which leads from the motor 6; also by connecting the contacts $F^2$ and $FF^1$ which carry the current in series through the fields 23 and 22 after passing through the resistances. The circuit in the second position of the controller is illustrated in Fig. 7 showing that the resistances 24 and 25 are cut out of the circuit by connecting the terminal F' directly with the contact A. The field circuit remains unchanged. In the third position of the controller, the resistance 25 is placed in parallel with the field coils by reason of the fact that its terminal $r^2$ (connected by conductor 27 with contact $R^2$) is connected to the terminal $ff^2$ as illustrated in Fig. 8. In the fourth position of the controller, both the resistances 24 and 25 are cut out and the fields 22 and 23 are connected in parallel through the medium of the controller which connects the terminals $ff^1$ and $ff^2$ and also connecting the terminals $f^1$ and $f^2$.

The two circuits resulting from reversing the controller are illustrated in Figs. 10, and 11. The direction of flow of the current through the motor, remains the same, passing in series through the fields in the reverse direction; for one position both resistances are in the circuit and in the other position both resistances are cut out of the circuit.

In the diagrams, Figs. 6 to 11, $G^1$ indicates a source of electro-motive force such as a generator or battery, and M' indicates a motor.

Referring again to Fig. 3, it will be seen that the inside pair of the lower contacts, that is the contacts 28 and 29 are connected in parallel with a wire 30. This wire may be attached to the terminal of a generator at a charging station in order to charge either of the batteries at 12, the outside lower contacts 31 and 32 of the switches being connected in parallel with a loose wire 32 which should be attached to the other terminal of the generator at the charging station through the medium of a charging receptacle mounted on the chassis. In charging thus, switch $S^1$ is closed down and $S^2$ is open.

When the vehicle is being driven by current from its own generator, the switch $S^2$ is closed by an upward movement so as to engage the upper contacts, the switch $S^1$ being open. This connects the generator directly with the motor and the controller, and this is the normal condition when the vehicle is running on the road. In order to start up the vehicle when it is standing at rest, I utilize the generator 10 as a motor and drive it with current from the auxiliary battery 12 to start the gasolene engine 8. The circuit from the auxiliary battery 12 to the generator is closed by putting both the switches $S^1$ and $S^2$ in their down closed position. This same position of the switches enables the auxiliary battery to be charged from the generator 10 because when the gasolene engine begins to run, it will develop a current in the generator opposing the current of the storage battery 12 which may charge the battery. In this connection attention is called to the fact that the current from the storage battery will drive the generator in the same direction in which the generator is driven in charging the battery, and this of course will drive the gasolene engine in the forward direction. When the power-generating mechanism or power plant comprising the gasolene engine and generator have been removed, the auxiliary battery 12 is also removed and the contacts 17 and 18 are connected with the terminals of the interchangeable storage battery B as indicated in Fig. 3. With this arrangement, the motor can be driven from the storage battery B.

As illustrated in Figs. 4 and 5, the battery B preferably consists of a plurality of cells 34 which are supported upon a grid 35, said grid comprising crossbars 36 attached to parallel bars such as the T bars 37, and for convenience, if desired, the grid may be provided with a platform 34ᵃ to support the cells as indicated in Fig. 4. Any suitable arrangement may be adopted for holding the battery B against shifting, and furthermore if desired, the ends of the power-chamber 5 may be closed by suitable covers, not illustrated.

In using the generator 10 as a motor, it is desirable to shift the brushes on account of the shifting of the axis of commutation, and in order to accomplish this, the brushes 38 are preferably attached to a carrier 39 which may be connected by link 40 with a controlling lever 41. Any suitable means may be provided for locking this lever 41 in the positions corresponding to the two axes of commutation. The lever 41 is in convenient position to be controlled from the driver's seat 14. In order to facilitate the disconnection of the link or connection 40, I prefer to provide the same with a coupling 42 of any suitable construction. This construction may be if desired, a turn-buckle having right and left threaded ends and held against movement by check-nuts. A similar coupling 44 may be adopted for connecting and disconnecting link 45 which is employed for connecting the carbureter 46 with a controlling lever 47 which is also arranged in a convenient position for the driver of the car. These couplings 43 and 44 are preferably near the forward side of the hanger 2 so that when they have been disconnected and the power mechanism has been removed, the interior of the hanger, that is, the power chamber 5 will be left unobstructed so that it will not interfere in any way with the introduction of the storage battery B.

In connection with the starting up of the engine by means of the generator 10, it should be noted that as the generator is a direct current generator, it will constitute a self-starting motor when used as a motor.

It is understood that the embodiment of my invention described above is simply the preferred form thereof, and I do not wish to limit myself in the practise of my invention or in the scope of the claims to the precise construction set forth.

What I claim is:—

1. In a motor vehicle in combination, a main frame having a single power chamber formed therein for receiving an electrical power developing plant, said chamber provided with means for removably mounting power plants of two different types within said chamber (such as a gas engine and a dynamo coupled together, or a main storage battery), each power plant being of sufficient capacity to act as the sole source of power for said vehicle, said chamber arranged to hold but one of said power plants at one time, an electric motor for driving said vehicle, an electric motor controller and a gas engine controlling means mounted adjacent the operator's seat, and switch controlled means for electrically connecting the power plant contained in said chamber with either said motor or an outside source of electricity.

2. In a motor vehicle in combination, a main frame having a single power chamber formed therein for receiving an electrical power developing plant, said chamber provided with means for removably mounting power plants of two different types within said chamber (such as a gas engine and a dynamo coupled together, or a main storage battery), each power plant being of sufficient capacity to act as the sole source of power for said vehicle, said chamber arranged to hold but one of said power plants at one time, an electric motor for driving said vehicle, an electric motor controller and a gas engine controlling means mounted adjacent the operator's seat, and switch controlled means for connecting the power plant contained in said chamber in circuit with said motor and controller, comprising one set of switches and contacts for use when the dynamo is mounted in said chamber as the power plant, and a separate set of switches and contacts for use when a main storage battery is contained in said chamber as the power plant.

3. In a motor vehicle in combination, a chassis having a power chamber formed therein adapted to receive and removably hold either one of two different electrical power developing plants (such as a gas engine and dynamo or a main storage battery), each power plant being of sufficient capacity to act as the sole source of power for said vehicle, said chamber being arranged to hold one of said power plants at a time, a power plant consisting of a gas engine and dynamo rigidly mounted in said chamber, an electric motor for driving said vehicle, removable connections between the terminals of said dynamo and motor, an electric motor controller and a gas-engine-controlling-device both mounted adjacent the operator's seat and operable by the operator, detachable connecting means between said gas-engine-controlling device and said gas engine, said power plant being removable as a whole from said chamber (that is, without disconnecting said engine and dynamo from each other).

4. In a motor vehicle in combination, a main frame having a single power chamber formed therein for receiving an electrical power developing plant, said chamber provided with means for removably mounting power plants of two different types within said chamber (such as a gas engine and a dynamo coupled together, or a main storage battery), each power plant being of sufficient capacity to act as the sole source of power for said vehicle, said chamber arranged to hold but one of said power plants at one time, an electric motor for driving said vehicle, an electric motor controller and a gas engine controlling means mounted adjacent the operator's seat, both having detachable connections leading to the interior of said chamber, and switch controlled means for connecting the power plant contained in said chamber in circuit with said motor and controller.

Signed at New York city this 13th day of November, 1912.

CHARLES A. WARD.

Witnesses:
W. C. EVANS,
CHAS. ADAMS.